Sept. 27, 1927.
P. H. GEIGER
1,643,337
RAILWAY TRAIN CONTROL APPARATUS
Filed Oct. 13, 1926
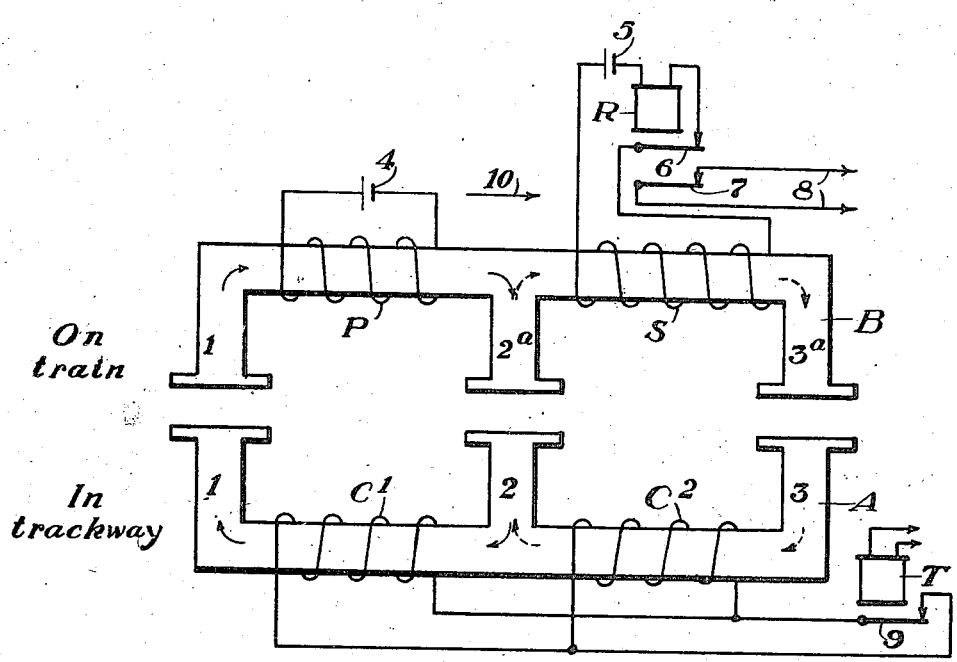
INVENTOR:
P. H. Geiger,
by A. L. Vencill
His Attorney Patented Sept. 27, 1927.

1,643,337

UNITED STATES PATENT OFFICE.

PAUL H. GEIGER, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-TRAIN-CONTROL APPARATUS.

Application filed October 13, 1926. Serial No. 141,334.

My invention relates to railway train control apparatus, and particularly to apparatus of the intermittent inductive type involving inductors located at intervals in the trackway and receivers on the trains.

I will describe one form of apparatus embodying my invention, and will then point out the novel features thereof in claims.

The accompanying drawing is a diagrammatic view showing one form of apparatus embodying my invention.

Referring to the drawing, the reference character A designates an inductor located in the trackway, and the reference character B designates a receiver located on the train, both of which elements are of magnetizable material, such, for example, as soft iron. The inductor A is provided with three upwardly projecting legs 1, 2 and 3, and the receiver B is provided with three downwardly projecting legs $1^a$, $2^a$ and $3^a$ arranged to register respectively with the inductor legs 1, 2 and 3 as the receiver moves over the inductor.

The inductor A is provided with a winding $C^1$ located between the legs 1 and 2, and a second winding $C^2$ located between the legs 2 and 3. These windings are connected together, but may both be placed on short circuit by a contact 9 of a relay T which may be controlled in any desired manner.

The receiver B is provided with a primary winding P which is located between the legs $1^a$ and $2^a$ and is included in a primary circuit with a battery 4. The receiver is also provided with a secondary winding S, which is located between the legs $2^a$ and $3^a$, and is included in a secondary circuit which passes from a battery 5, through the winding of a relay R, front contact 6 of relay R, and the secondary S to the battery 5. A second front contact 7 of relay R is included in a circuit 8 which may be utilized to control any form of governing apparatus on the train, such, for example, as the train brakes or a cab signal.

The operation of the apparatus is as follows: Normally the train-carried relay R is energized due to current from battery 5. Assuming that the train is moving in the direction indicated by the arrow 10, when the receiver B registers with the inductor A, as shown in the drawing, the magnetic flux due to current in the primary winding P will flow in the path indicated by the solid arrows, thereby inducing a current in the winding $C^1$ on inductor A. If contact 9 of relay T is open, the current produced in winding $C^1$ will flow through winding $C^2$, and the current in the latter winding will create a magnetic flux which will flow in the path indicated by the arrows shown in dash lines. This flux will induce a current in the secondary winding S one half of each wave of which will reduce or even reverse the current flowing through relay R from battery 5, and will thereby cause this relay to become de-energized. If, however, contact A of relay T is closed, substantially all of the current induced in winding $C^1$ will flow through contact 9 instead of through winding $C^2$, and, consequently, this current will have no effect on the secondary winding S and so will not cause relay R to become de-energized.

I will now assume that the receiver B passes over a mass of iron in the trackway. When this iron is under legs $2^a$ and $3^a$, there will be only a slight change in the magnetic flux in that portion of the receiver core which includes the secondary winding S, since there is no considerable source of magnetomotive force in this portion of the receiver core because of the resistance of relay R which is included in circuit with battery 5. There will, therefore, be only a slight change in the current flowing through secondary winding S, and, consequently, the relay R will not be affected. When the iron is under the legs $1^a$ and $2^a$, the flux through the portion of the receiver core which includes the primary winding P will increase, but this has a negligible effect on the flux through the portion of the core including the secondary S, and therefore will not affect the relay R. It will be seen, therefore, that no iron in the trackway, other than the inductor A, will affect the train-carried relay R.

The magnetic structures of the inductor and receiver may take several forms. For example, these parts may each be constructed in two sections as if split on a line drawn through the centers of legs 2 and $2^a$, and the two pairs thus obtained may be placed in any positions relative to each other but with the two members of each pair associated as shown, that is, so that each receiver section will pass over the corresponding inductor section.

My invention provides magnetic structures for the receiver and the inductor which will increase the ratio of the impulse due to an inductor as compared to the impulse due to other iron masses in the trackway. This will permit operation of the relay R at a lower speed than has hereto been possible, or will permit a greater clearance between inductor and receiver than has hereto been possible, or both.

Although I have herein shown and described only one form of train control apparatus embodying my invention, it is understood that various changes and modifications may be made therein within the scope of the appended claims without departing from the spirit and scope of my invention.

Having thus described my invention, what I claim is:

1. Railway train control apparatus comprising a trackway inductor having three upwardly projecting legs, two windings on said inductor located respectively between the first and second legs and the second and third legs, said windings being connected together, means for at times placing both of said windings on short circuit, a train carried receiver having three downwardly projecting legs arranged to register with the three legs on said inductor, a primary winding on said receiver between the first and second legs and included in a closed circuit with a source of current, and a secondary winding on said receiver located between the second and third legs and included in circuit with a source of current and a relay and a front contact of said relay.

2. Railway train control apparatus comprising a trackway inductor and a train carried receiver, a train carried primary circuit including a primary winding on a portion of said receiver and a source of current, a first winding on a portion of said inductor arranged to have current induced therein by said primary circuit when the inductor and receiver register, a second winding on another portion of said inductor and included in circuit with said first inductor winding, a train carried secondary circuit including a secondary winding on another portion of said receiver and a source of current as well as a relay and a front contact of said relay, said secondary winding being arranged to have current induced therein by said second inductor winding when the inductor and receiver register which current is in opposition to the source in said secondary circuit, and means for at times placing both of said inductor windings on short circuit.

3. Railway train control apparatus comprising a trackway inductor and a train-carried receiver, a train-carried primary circuit including a primary winding on a portion of said receiver and a source of current, a first winding on a portion of said inductor arranged to have current induced therein by said primary winding, a secondary winding on another portion of said inductor and included in circuit with said first inductor winding, and a train-carried secondary circuit including a secondary winding on another portion of said receiver arranged to have current induced therein by said second inductor winding, and means for at times preventing said first inductor winding from supplying current to said second inductor winding.

4. Railway train control apparatus comprising a trackway inductor and a train-carried receiver, a train-carried primary circuit including a primary winding on a portion of said receiver and a source of current, a first winding on a portion of said inductor arranged to have current induced therein by said primary winding, a secondary winding on another portion of said inductor and included in circuit with said first inductor winding, a train-carried secondary circuit including a secondary winding on another portion of said receiver and a source of current as well as a relay and a front contact of said relay, said secondary winding being arranged to have current induced therein by said second inductor winding which current is in opposition to the source in said secondary circuit, and means for at times preventing said first inductor winding from supplying current to said second inductor winding.

5. Railway train control apparatus comprising a trackway inductor and a train-carried receiver each formed in two sections, the two sections of the receiver co-operating respectively with the two sections of the inductor, a primary circuit including a primary winding on one section of said receiver and a source of current, a secondary winding on one section of said inductor arranged to have current induced therein by said primary circuit, a second winding on the other section of said inductor and included in circuit with said secondary winding, a secondary circuit including a secondary winding on the other section of said receiver and a source of current as well as a relay and a front contact of said relay, said secondary winding being arranged to have current induced therein by said second inductor winding when the inductor and receiver register which current is in opposition to the source in said secondary circuit, and means for at times placing both of said inductor windings on short circuit.

In testimony whereof I affix my signature.

PAUL H. GEIGER.